United States Patent [19]

Stenudd et al.

[11] 4,423,361
[45] Dec. 27, 1983

[54] MECHANICAL DRIVE APPARATUS FOR PROVIDING LINEAR MOTION IN RESPONSE TO ELECTRICAL DRIVE SIGNALS

[75] Inventors: Sven G. V. Stenudd; Lars-Gunnar M. Stenudd, both of Lidingö, Sweden

[73] Assignee: Facit Aktiebolag, Atvidaberg, Sweden

[21] Appl. No.: 237,034

[22] Filed: Feb. 23, 1981

[30] Foreign Application Priority Data

Feb. 27, 1980 [SE] Sweden ............................ 8001511

[51] Int. Cl.³ .................................................. G05B 11/00
[52] U.S. Cl. .................................... 318/135; 318/119; 318/687; 310/12
[58] Field of Search ............... 318/135, 687, 119, 121, 318/122; 310/12, 13

[56] References Cited

U.S. PATENT DOCUMENTS

| | | | |
|---|---|---|---|
| 1,678,278 | 7/1928 | Weyandt | 318/135 |
| 3,192,488 | 6/1965 | Faith et al. | 318/119 |
| 3,430,120 | 2/1969 | Kotaka et al. | 318/687 |
| 3,751,693 | 8/1973 | Gabor | 310/13 |
| 4,149,807 | 4/1979 | Avison et al. | 400/118 |
| 4,276,499 | 6/1981 | Masuda | 318/119 |
| 4,281,263 | 7/1981 | Virolleau et al. | 310/13 |

FOREIGN PATENT DOCUMENTS 1145712 3/1963 Fed. Rep. of Germany .
333972 1/1968 Sweden .
378490 1/1975 Sweden .

OTHER PUBLICATIONS

IBM Tech. Disclosure, vol. 15, No. 2, Jul. 1972.

*Primary Examiner*—B. Dobeck
*Attorney, Agent, or Firm*—Pollock, Vande Sande & Priddy

[57] ABSTRACT

A drive means comprising a movable part and a fixed part provided with a stator winding and a magnet yoke with a magnetic gap. A soft-iron magnetic portion is arranged in the magnetic gap. A current generator generates a first current for a stator winding and a second current for another stator winding, the sum of the magnitudes of the two currents being constant. The reluctance effect causes each of two soft-iron magnetic portions to be pulled into an individual magnetic gap driven by one of the two currents. The two reluctance forces vary quadraticly with the two currents, but due to the fact that the net force is the difference between them, this net force will be linearly dependent on the currents. It is suitable to allow the two currents to come from the same amplifier stage, which is push-pull coupled.

16 Claims, 19 Drawing Figures

MECHANICAL DRIVE APPARATUS FOR PROVIDING LINEAR MOTION IN RESPONSE TO ELECTRICAL DRIVE SIGNALS

The invention relates to a drive means, comprising a movable portion and a stationary portion provided with a stator winding and a magnetic yoke with a gap, a soft-iron magnetic portion of the movable portion being arranged in the magnet gap.

It is known that a soft-iron magnetic plate arranged partially inserted in a magnet gap strives to move completely into the gap. Since the reason for this has to do with the change in the resistance in a magnetic circuit, and it is measured as reluctance, we can suitably speak of a reluctance force here.

The change in reluctance in a magnetic circuit as a result of the insertion or extraction of a magnetic ("magnetism conducting") member into or from a magnetic gap has been used previously for sensing purposes, for example in the so-called variable reluctance pickup for phonographs. In drive means the principle has also been used in step motors.

The present invention is based on this known reluctance force for a soft-iron magnetic plate or the like inserted into a magnetic gap or the like.

For the simple case that a rectangular plate is partially inserted into a magnetic gap limited by a straight line, the pulling force which the magnet exerts on the plate is proportional to the square of the magnetizing field, i.e. to the square of the current in a coil which magnetizes the magnetic gap.

Figure 1:
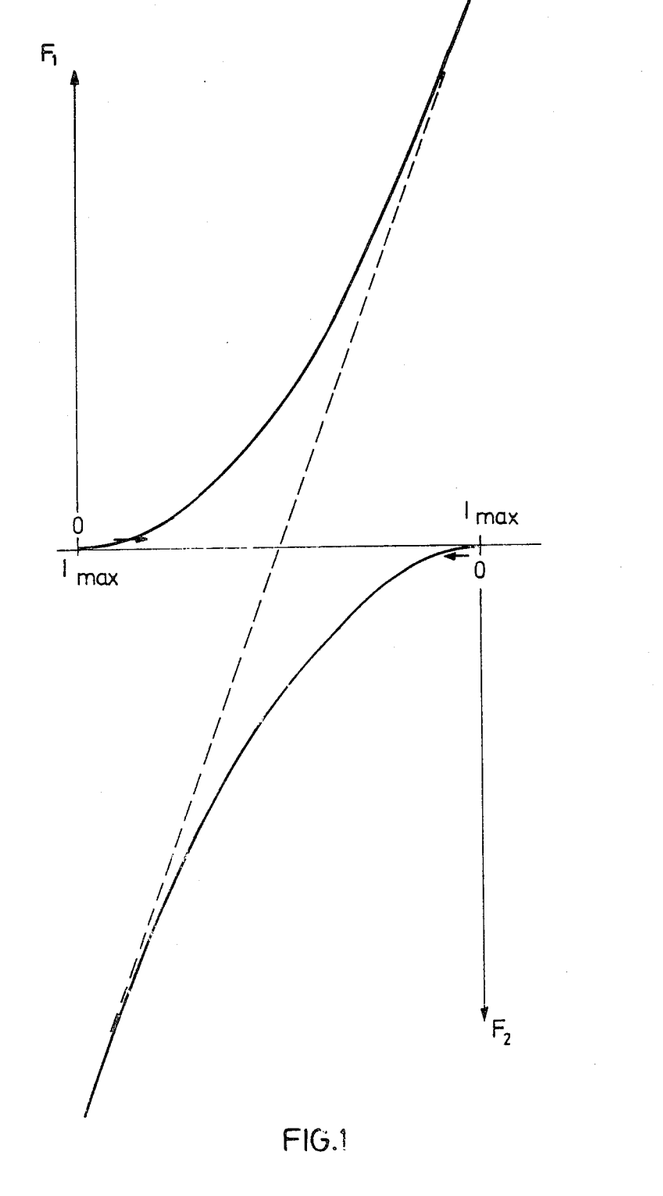
FIG. 1 is a diagram which shows the principle for achieving a linear force.

Thus, a drive device based on this principle produces a quadratic effect, which is in many cases unfortunate, especially for electronic control. According to the present invention this square-law effect is eliminated by allowing two such forces to oppose each other, so that under certain conditions a linear force is achieved. An example of this is shown in FIG. 1. The precondition is that one must have two identical opposing systems of reluctance type. These are driven by individual currents. The sum of the absolute values of the currents must be constant. We see that one force $F_1$ increases parabolicly as the current goes from 0 to $I_{max}$. Parallel thereto, the second force $F_2$ decreases parabolicly from a force corresponding to $I_{max}$ to 0 corresponding to a 0 current. As can be seen from FIG. 1 and which can be easily demonstrated analytically, the result of the subtraction of the two forces will be a linear expression. It is thus possible to achieve a linear force by this compensation principle.

This is exploited practically according to the invention by a drive means which has the characteristics disclosed in claim 1.

A movable portion of the drive means is arranged with a soft-iron magnetic portion in a magnetic gap, while another portion is arranged in another magnetic gap. Their magnetic fields are controlled by two currents with the given relationship, the system being arranged so that the two forces thus created oppose each other. It should be pointed out that the resultant force obtained is not dependent per se on the postition of the movable portion along its driven movement, since the reluctance force on a disc inserted into a magnetic gap is only dependent on the length of the line within the region where a field gradient prevails.

The invention can be used for both linear movement and rotational movement. The invention can be viewed as a sort of muscle. Such a muscle with a force which is linear can be put to many different uses. It is possible for example to stretch a spring, so that the position of the movable means will determine the force exerted. Furthermore, the invention can be used for position control, with the movable portion being coupled to a position sensor which gives a position signal, whereby the force can be controlled by feedback, so that the movable portion can be controlled to a specified setting.

An interesting application of the invention is in the area of printers. It is possible to arrange two controlled "force muscles" according to the invention to move a pen in the x- and y-directions in accordance with a predetermined path. If a third "muscle" is arranged for lifting the pen, characters and the like can be written out.

It is suitable to arrange three drive means together in a writing head, which is movably arranged on a carriage, approximately as in a ball-type typewriter. Rotational type drive means are especially suitable in this case since they are simple to manufacture and have a low inertia, permitting high writing speeds.

The inventive force producer can be constructed either for linear movement or for rotational movement. For rotational movement, it is possible to achieve a rotational movement exceeding about 180° by arranging two half-moon magnetic gaps and a half-moon "flag" rotatable in relation thereto and provided with a rotational shaft perpendicular thereto. It is possible to arrange several such sets on the same shaft.

If one does not require such a large angular interval for the force, it is possible to arrange several circular sectors in a plane, said sectors extending more or less into individual sector-shaped magnetic gaps lying in the same plane. This produces higher torque and acceleration. In this case it can be suitable to let these magnetic gaps be magnatized with one of the two currents and allow the opposing force to be exerted by another set of magnetic gaps on another similar set of sector-shaped flags arranged axially displaced on the same shaft.

As regards the use of the invention for linear movement, the same principle can be applied mutatis mutandis. A possible embodiment consists of a shaft or the like arranged for axial movement on which rectangular flags are arranged in a plane coinciding with the shaft. As in the rotational case, it is possible to either mount each flag so that it sticks in with different ends in two competing magnetic gaps, or it is possible to arrange each flag in relation to a single magnetic gap.

In order for two opposing forces, controlled by currents, whereby the force is proportional to the square of the current, to achieve a linearly dependent force, it is electronically most suitable to generate the two currents in the same current producer, functioning according to the known push-pull principle or the like. It is thus relatively simple to achieve two currents, the sum of which is constant. This design is preferred over making a special design for the magnetic gaps, but the most essential aspect of the invention is considered at present to be the idea of achieving a linear force by allowing two quadratic forces to counteract.

DESCRIPTION OF THE FIGURES

The invention will now be described with reference to examples, which are not intended to limit the invention itself but only to facilitate the understanding thereof.

FIGS. 5 A and B show schematically a linearly working embodiment.

FIGS. 9 A, B and C show a linear "muscle".

FIGS. 10 A-G show a rotating "muscle".

DESCRIPTION OF PREFERRED EMBODIMENTS

FIG. 1 shows the principle for compensation of two square-law forces $F_1$ and $F_2$, generated by individual currents. The currents vary from 0 to $I_{max}$ being interdependent by the fact that the sum of the absolute values of the two currents is always equal to $I_{max}$. The dashed line shows the linear dependence of the composite force on the currents.

Figure 2:
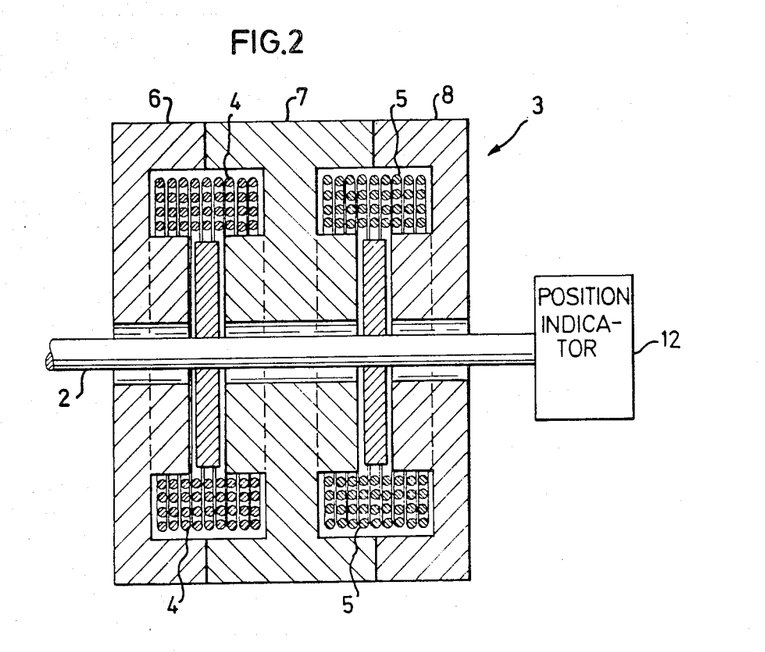
FIGS. 2-4 show an embodiment using the invention as a rotating "muscle".
Figure 3:
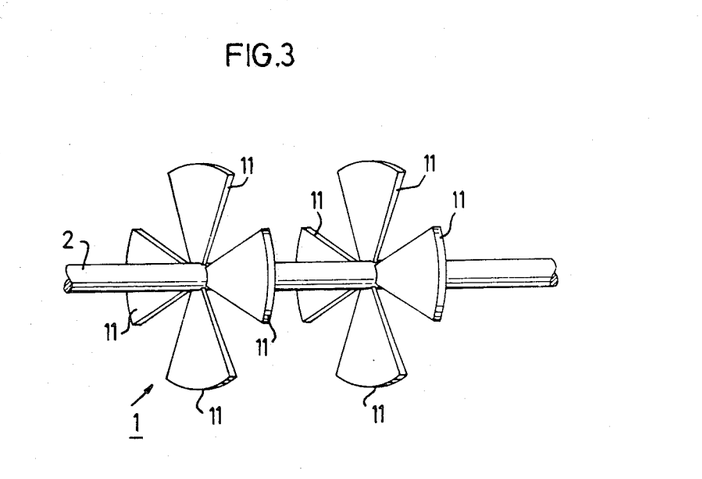
Figure 4:
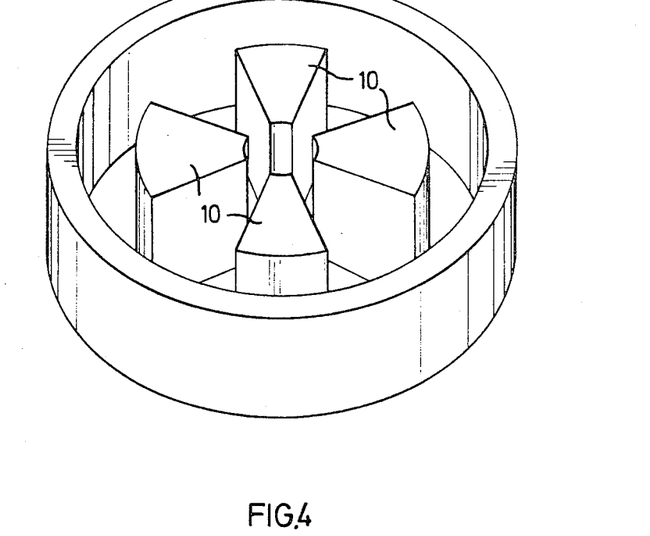

FIGS. 2, 3 and 4 show an example of a "muscle" intended for producing torque. A movable portion 1 consists of a shaft provided with two propeller-like rotors of soft-iron. The shaft 2 is rotatably mounted in a manner not shown. The flat rotors are mounted in magnetic gaps in a magnet yoke 3 with windings 4 and 5 as shown in the sectional view in FIG. 2. The magnetic yoke is composed of three pieces 6, 7 and 8 of soft-magnetic material made by casting or powder-pressing. FIG. 4 shows schematically and in perspective one of the pieces 6 or 8. As can be seen in FIG. 4, the piece has elevations 10. The middle piece 7, which is not shown separately here, has similar elevations, and when the pieces are assembled sector-shaped magnetic gaps are created between facing elevations 10, in which the rotor wings 11 according to FIG. 3 can move. In the example shown there are four wings and four magnetic gaps in each space between the pieces 6 and 7, and 7 and 8, respectively. Piece 7 thus has elevations 10 in both directions. Outside the elevations 10, there is an annular space for a magnetizing coil 4 or 5. These coils are fed with the complementary currents according to FIG. 1, and the coils are each coupled to one of the currents. The force exerted on one propeller opposes the force on the other. With the configuration shown in FIG. 3, the magnetic gaps in the two yokes should be rotationally displaced. As a result of the configuration, a linear rotational force will be obtained over an interval amounting to about ⅛th of a revolution, with the various blades in the same rotor adding their rotating forces.

In accordance with a special aspect of the invention, a position sensor 12 is coupled to the shaft, thus making it possible to control the turning of the shaft 2 to a specific angular position. There are many different types of such position sensors. A type which has proven suitable consists of a stationary unit consisting of a light-emitting diode directed towards a photodetector, and a flag fixed to the shaft 2 cuts off a greater or lesser portion of the light from the light-emitting diode before it strikes the photodetector. Since these devices are well-known and commercially available, there is no reason to describe them further here.

The outer edges of the flags 11 shown in FIG. 3 are illustrated as circle arcs with their center at the axis of the movable means. This is normally advisable, but it is also possible to deviate from this shape in order to compensate for saturation effects in the magnetic material of the yokes.

Furthermore the spaces between the magnetic gaps have been drawn as being as wide as the magnetic gaps, but it is suitable to make the spaces with a 5% smaller angular width than the magnetic gaps, thus assuring unambiguous direction of rotation.

It can also be remarked that the embodiment shown can be varied in many ways, so that the "propeller blades" and the magnetic gaps can have different shapes, the only requirement being that they fit each other so that the line integral $\oint B^2 r dr$ over the intersection of the magnetic gap edges with the flag is constant for a given fixed current.

Figure 5A:
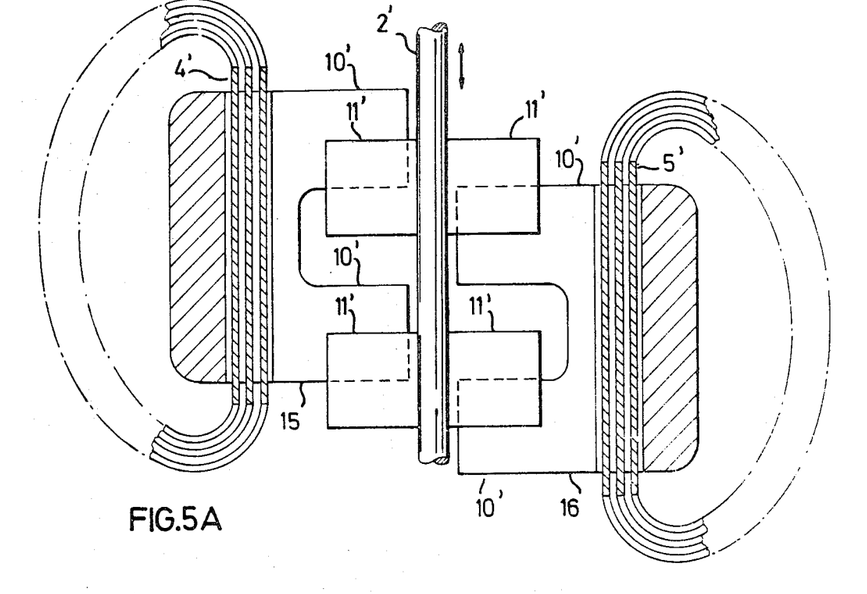
Figure 5B:
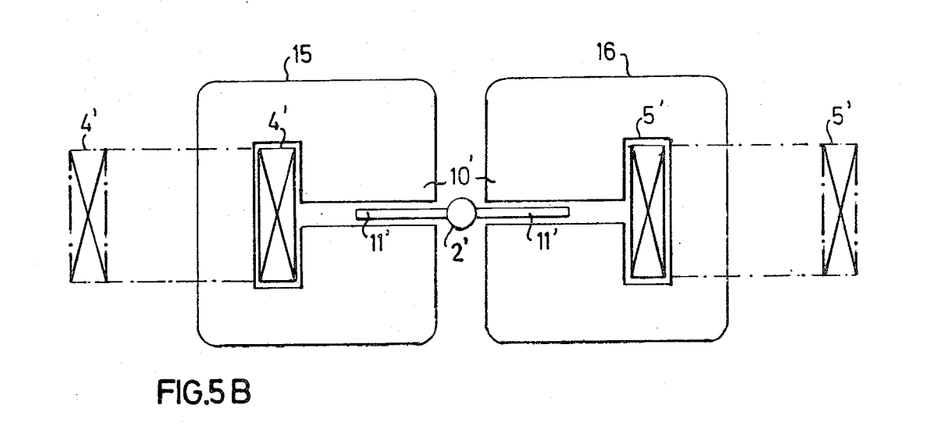

FIG. 5 shows schematically a section through a "muscle" arrangement for linear force production. Soft-iron magnetic flags 11' are fixed on a shaft 2'. The flags are arranged in magnetic gaps formed in magnet yokes 15 and 16, only half of which are shown in section. In FIG. 5 the flags 11' are inserted into the respective magnetic gaps only halfway. The magnetic yokes have windings 4' and 5', which are assumed to be fed by complementary currents as according to the above. A net force will then act on the shaft 2' mounted for axial movement. The figure does not show how the magnet yokes 15 and 16 are mounted, but it will be understood that they must be fixed to a machine frame or the like. It is also clear that the shaft 2 must be mounted so that it can move axially but without rotating or with relatively insignificant rotation, since the flags 11 must be kept within the magnetic gaps. Since suitable machine members are wellknown to the mechanical engineer, there is no need to discuss all the embodiments which are possible, especially since they have little to do with the actual core of the invention. As in the rotational embodiment, it can also be suitable here to arrange a position sensor on the shaft 2', to use the force producer as a position transducer.

Figure 6:
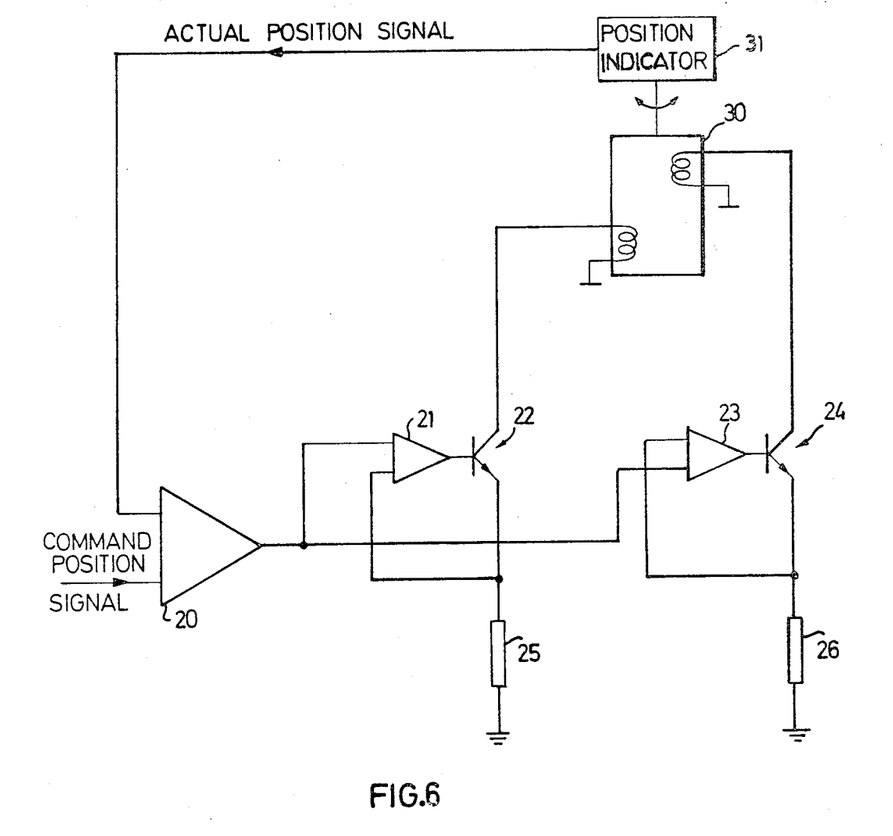
FIG. 6 shows a coupling diagram with a current unit.

FIG. 6 shows a suitable current unit coupled to a force producer of rotational type, provided with a position sensor which emits an actual position signal. Two coils in the force producer 30 are only shown schematically. As can be seen from the diagram, there are three operation amplifiers which can be of the LM 124 type. It is evident from the figure that the incoming command position signal is compared in the operation amplifier 20 with an actual position signal from the position sensor 31. The resulting differential signal is led to the normal input of one and to the integrating input of the other of two additional operation amplifiers 21 and 23, respectively, the other inputs of which are recoupled via emitter resistances 25 and 26 to transistors 22 and 24 the base inputs of which are coupled to the outputs 21 and 23 of the operation amplifiers. In practice the transistors are most suitably Darlington units, which for the sake of comprehension are shown as ordinary transistors. Since we are using current control, the resistances 25 and 26 are small, on the order of magnitude of 0.1 ohm. To save power it can be suitable to arrange the current regulators as so-called switched regulators. For the sake of clarity and since this circuit design is known, positive feedback nets have not been drawn in. It is enough to state that the coils themselves in the unit 30 serve as the current-smoothing element.

This coupling assures that the necessary requirement that the currents in the two coils in the unit will be complementary will be fulfilled, as explained above.

It is of course possible to arrange the magnetic field devices so that they are not symmetrical, so that the sum of the currents will not be constant and in this case the requirement is that the H-magnetic fields producing the active forces or torques have values the sum of which is constant.

Thus the actual principle for the inventive "electronic muscle" has been explained in its basics. It is clear that materials and design must be selected with regard to the intended use. If for example the "muscle" is to be used for slow applications, the requirements of the selected magnetic material are not especially high. An advantageous characteristic of the invention is however that it is possible to get the "muscle" to work quite rapidly. To prevent the effects of Foucault currents it is important to remember to use either laminated constructions or highly resistant magnetic materials, the latter being preferable. This applies both to the yokes and flags. As regards the yokes, designs such as those shown in FIG. 4 can be made with great advantage by pressing (die-casting and the like), thus providing inexpensive manufacture in large series. A suitable material in certain cases is ferrite material. Transformer material is however preferable, e.g. Vacoflux ® or Trafoperm ®.

According to an especially preferred use, the invented "muscle" is used for a writing machine or "microplotter". It is obvious that the old type arm machines are no longer fast enough, and the type ball should eventually meet the same fate. The principle of the "daisy wheel" has the disadvantage that it is relatively expensive and it cannot fulfill the more and more aggressive noise regulations. Furthermore its character repertoire is limited to about 100. The present invention however enables one to depart entirely from the old principle of the impact typewriter by introducing instead a writing implement which actually writes.

According to the proposed embodiment, a pen is used which is moved according to two coordinates by means of two positionally controlled "muscles" in accordance with the invention. It is preferable to use the rotatable embodiment, both because it is simple to manufacture and because there are fewer problems with inertia.

Figure 7:
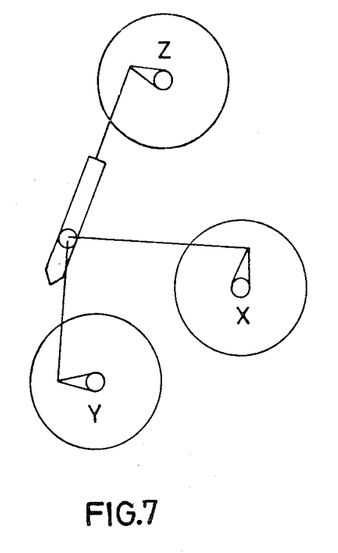
FIG. 7 shows the principle for a character writer.

FIG. 7 shows a schematic example of a pen mover suitable for mounting in a writing head. Initially it is intended that it write one letter at a time and be moved between each letter or each written character, approximately as a type ball or "daisy wheel" unit. The required length of stroke is relatively short, therefore it is possible to obtain the required linear movement by mounting pivot arms on the rotatable "muscle". In the example shown there are two "muscles" x and y for movement in the plane of the paper and a third "muscle" which is used for lifting the pen. Three different signal wave forms are delivered from a computer to individual control units of the type shown in FIG. 6 and which are coupled with their two force producing currents to the three "muscle units".

Figure 8:
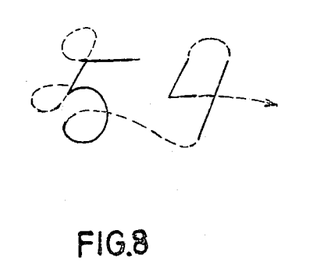
FIG. 8 shows a suitable method for writing characters therewith.

FIG. 8 shows suitable paths of movement for the pen when writing the numerals 5 and 4 in sequence. It is apparent that in order to preserve speed the pen movement should be arranged with as few sharp turns as possible and preferably allow the pen to turn in small loops above the paper as shown with the dashed lines in FIG. 8.

The pen itself can be made in different ways. A preferred embodiment is a stylus point with a suitable radius of curvature which is moved over the paper with an ink ribbon between them. It can be suitable to allow the z-muscle to control, in addition to the lifting movement, the pressure as well and thus the width of line when the ink is transferred to the paper. The pen can also be made to dispense its own ink, and it can be made as an ink spraying nozzle.

The proposed writing mechanism is not limited to the typical typewriter configuration but can also be used in writers which write on flat paper.

An advantage of a writing machine provided with "muscles" according to the invention is the high speed made possible by the rapid acceleration capability. Experiments with simple models have achieved writing speeds of 15–20 characters per second and it is expected that about 100 characters per second can be achieved. The writing quality is quite dependent on the degree of complexity of the electronics unit. The highest writing quality can be difficult to achieve when using exactly the same kinds of font used today for printed letters because the method limits the capability of making sharp corners. It is therefore presupposed that special adapted kinds of font will be developed. This disadvantage is not great, and it may be useful to mention that Gutenberg had to make similar changes from the bookscript of his time. It is possible that this invention may result in a return to something more resembling handwriting.

Figure 9A:
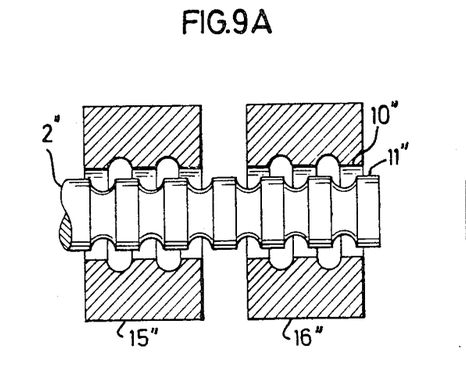
Figure 9B:
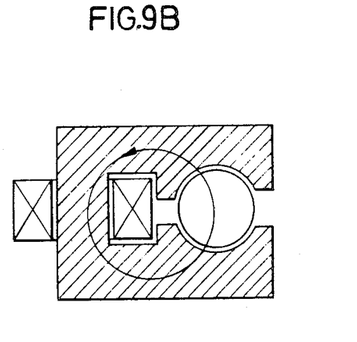

FIGS. 9 A and B illustrate an especially preferred embodiment of a linear force producer. FIG. 9 A shows a longitudinal section through the device, with the movable portion 2" and the stators 15" and 16". Instead of flags, the movable portion has been provided with rings 11" with cylindrical outer surfaces fitting into cylindrical magnetic gaps 10". FIG. 9 shows how the magnetic gaps are arranged in relation to the windings and the movable portion. We see that the magnetic field is generated around the winding and passes essentially perpendicularly across the gaps between the movable portion and the stator.

An advantage of this design is the degree of rotational symmetry. Although it is not shown, the magnetic yokes are suitably made as two mirror-symmetrical portions which are fastened over the wound coil. Furthermore the movable portion is entirely rotationally symmetrical, which is designed to greatly reduce manufacturing costs.

Thus the magnet yokes have annular, inwardly facing grooves, and due to the greater distance, the magnetic flow will only pass between the cylinder portions 10" to an insignificant extent.

This construction can also be modified by adding at least one additional magnet yoke unit along the extension of the movable portion, and through which a third driving current is conducted. It is thereby possible to obtain the function of a "linear step motor", so that one is no longer restricted to the short step interval determined by the step lengths of the poles and the movable portion. This effect can be combined with the inventive effect, especially if a position indicator is arranged, so that it is actually possible to produce a movable portion which can be displaced arbitrarily with full control. Such a device can be used in a virtually unlimited number of areas.

Figure 9C:
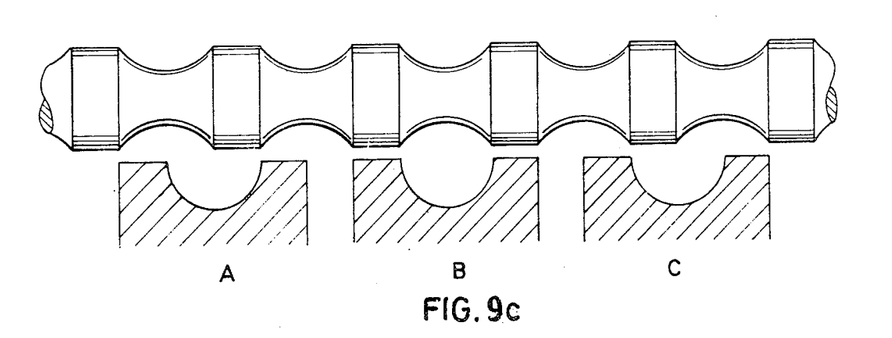

FIG. 9 C shows such a force producer with schematically shown pole shoes A, B, C, each of which is fed by an individual winding. The ratio of the plateaus on the yoke and on the movable portion to the spaces therebetween is 1:2. Furthermore the plateaus in the three yokes are displaced by one plateau length so that when the movable portion is centered over B, the plateaus are right on the edge from opposite directions for A and C. This positioning means that the forces from A and C will compete while no force at all is obtained at B. In this position B can be allowed to be currentless. The person skilled in the art will see how the three currents should suitably be related in order to obtain the inventive effect in each position, either by allowing each of the three coils to conduct a different current or by having one of the coils currentless in each position.

Figure 10:
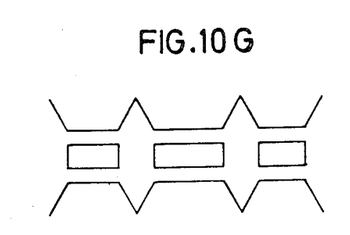

FIGS. 10 A–G show an embodiment for a rotating driving device which is the preferred embodiment at present. Since the principle is the same as that described in connection to FIGS. 2, 3 and 4, we will only describe the most important special features. FIG. 10 A shows a cross section in which the parts have been pulled out from each other for the sake of clarity. The propellers 11 in the drawing have been displaced on the shaft 2 (which is of course not possible in practice; they are preferably hard-soldered to the shaft). FIG. 10 B shows schematically from above the piece 8 in FIG. 10 A.

FIGS. 10 C–F show the relative placement of the rotors 11 and the stators 10. For manufacturing reasons it is preferable to arrange the poles 10 of the yoke above each other and therefore the rotors must be angularly displaced in relation to each other, as shown schematically in FIGS. 10 D and 10 E, compared to the stator poles 10 C and 10 F. Only then can the maximum effect interval be achieved.

The shape of the poles can be seen especially in FIGS. 10 A and 10 G. FIG. 10 G is a spread out figure of the poles in the usual manner for illustrating electric motors. It shows that the poles are conically shaped, with flat portions which form the active magnetic gaps. It is known per se in electromagnets that a field image with a short transition area between full field and low field is obtained by bevelling the edges of the poles. That effect, as regards the radial limiting edges of the field, is achieved with the form revealed in FIG. 10 G. The coning from the center as revealed in FIG. 10 A causes the magnetic flow to be pulled outwards to a larger degree, towards larger radiae. Since we are trying to achieve as large a torque as possible, this is an advantage. Furthermore there is improved efficiency.

Although the use of this invention has mostly been exemplified with writing machine uses, this should not be regarded as limiting, since the person skilled in the art will immediately see its use both as a force or torque producer and as a position setter. It can be noted for example that the embodiment shown in FIGS. 9 A and B can be used as a drive means in a loud-speaker. In ordinary electrodynamic loudspeakers there is the problem that a small coil must be arranged in a narrow annular magnetic gap, making it difficult to achieve high power because of the heating of the coil. This difficulty can be avoided in a construction according to the invention, i.e. because the movable member does not have any coil and high temperatures can therefore be tolerated.

It is somewhat surprising that the force on the soft-iron magnetic portion inserted into a magnet gap magnetized by a coil is essentially constant and independent of how much of it has been inserted as long as the current is constant, until saturation phenomena occur. This is an empirically tested fact which can however be verified by simple calculations.

It has been stated in the description and claims that the soft-iron magnetic portion must be movable. This is to be understood that it must be movable in relation to the electromagnetic device and it is clear that it is possible to arrange the soft-iron magnetic portion to be stationary with the portion provided with windings being movable. Thus the term "stator windings" should not be interpreted literally such that the "stator" must be fixed.

An example of this reverse geometry is the arrangement of a linear muscle to move a typewriter carriage. It is suitable to have a configuration such as that shown in FIG. 9 C with three coils be arranged so that the shaft 2" with grooves is fixed, while the "stator" consisting of the three magnet yokes A, B, C, is mounted in the movable typewriter carriage.

It is also possible to drive a drive unit according to the invention with sine-wave shaped currents. To obtain high efficiency it is suitable to arrange mechanical resonance at working frequences. Both the linear and the rotating device are suitable for vibrator devices. It is also possible to arrange two drive means in push-pull and thus eliminate vibrations in a pump for example. Two linear devices working against each other can each be made to drive a piston in order to provide a particularly vibration-free operation. Two rotating devices can also be arranged correspondingly.

Devices with three "stator windings" can also be coupled for three-phase operation to the ordinary AC-mains. This provides a synchronous motor which quite surprisingly has a high starting torque at zero speed. The drive means according to the invention can also be used for motor constructions, both linear and rotating.

One promising application has to do with elevators. One can allow the "stator winding" to be mounted in the movable elevator car, with a fine-toothed rack being mounted stationary. Two such devices in individual corners should provide a suitable elevator device, but a protected rack in the center should be an inexpensive construction.

The same principle can be used for all types of lifting devices, since forces can be mobilized which are of the same size as in hydraulic devices. Efficiency is no major problem. Tests have demonstrated mechanical efficiencies for drive means according to the invention of between 60 and 90%, depending on size.

What we claim is:

1. A drive apparatus comprising:
   yoke means for forming first and second magnetic gaps, each having a magnetic flux supplied by first and second stator windings;
   a moveable magnetic member having first and second portions disposed in said first and second magnetic gaps, and moveable with respect to said magnetic gaps; said first and second portions having complementary surface areas whereby one increases in size with respect to its respective gap upon motion thereof, and the remainder simultaneously decreases in size with respect to its respective gap;
   means for supplying complementary electric driving currents to each of said stator windings, one of said currents having a magnitude which increases with increases in an input signal and the remaining of said currents having a magnitude which decreases with increases in said input signal, said currents related whereby when one of said currents is zero, the remaining current has a predetermined magnitude, whereby opposite acting forces are exerted on first and second portions of said moveable member, each of said magnetic gaps in response to a respective stator winding current produce a force which changes quadratically with said current, the sum of said forces produced by said gaps providing a linear movement between said yoke means and said moveable magnetic member.

2. Apparatus according to claim 1, wherein the movable part is coupled to a position indicator which delivers a position signal to a comparing circuit for comparison with a command position signal and generation of the signal controlling the current generator.

3. Apparatus according to claim 1 wherein the sum of the magnitudes of the two driving currents is constant, whereby an increase in one driving current results in an equally large decrease in the other driving current.

4. Apparatus according to claim 1, producing linear movement, including a member mounted for linear movement, to which at least one soft-iron projection is fixed in a plane parallel to the direction of the linear movement, the soft-iron flag being limited by one edge parallel to the direction of the linear movement and by two edges perpendicular thereto, the magnetic gaps terminated along straight lines which are perpendicular to the direction of the linear movement.

5. Apparatus according to claim 2 or 3, for producing linear movement, which includes an substantially rotationally symmetrical moveable magnetic member with annular right-cylindrical portions, and ring poles magnetized by the two drive currents whereby said annular portions are moved by reluctance force.

6. Apparatus according to claim 5 wherein three drive currents are coupled to magnetize a respective magnetic ring pole, and wherein the annular right cylindrical portions include a spacing which is twice as long as the axial lengths of the portions.

7. An apparatus according to claim 1 wherein said moveable magnetic member includes a rotatably mounted shaft, and a soft iron flag perpendicular thereto having a circular edge with a radius of curvature centered on said shaft.

8. Apparatus according to claim 7 wherein the rotatably mounted shaft includes two sets of soft-iron flags, axially spaced along the shaft, there being n flags in each set, each flag including a circular sector with an angle of arc of about 360°/2 n symmetrically arranged, and an equal number n of magnetic gaps included in the plane of the flags with corresponding configuration and shape, the magnetic gaps of said two sets producing a rotational force on one set which opposes the rotational force on the other set.

9. A drive apparatus comprising:
a first and a second stator winding on a first and a second magnetic yoke, said yokes providing a first and a second magnetic gap, respectively;
a part moveable relative to said yokes and having a first and a second soft-iron portion thereof entered at least partially into a respective one of said first and second gaps, the moveable part being moveable relative to said magnetic gaps for changing the portion of said soft-iron portions in said gaps of said moveable part in a first direction, whereby said first soft-iron portion moves into said first gap and said second soft-iron portion moves out of said second gap, and a movement of said moveable part in a second direction moves said first soft-iron portion out from said first gap and moves said second portion into said second gap; and
a current source having a signal input and two current outputs, each output coupled to a different one of said stator windings, said current source having means for emitting at one of said outputs a current to a connected winding having a magnitude increasing with an increase in magnitude of a signal to said signal input, and for emitting at the other of said output to another of said windings another current having a magnitude decreasing with an increase of said signal, said currents being related whereby when one of said currents is zero, the other one has a predetermined magnitude.

10. A drive apparatus comprising:
two magnetic yokes, each provided with a winding, each having a pair of pole shoes forming a gap, said gaps being aligned in a straight line, said pole shoes having annular grooves facing the gaps, said grooves interspacing cylindrical plateau portions of the yokes, and a longitudinal moveable part disposed in said gaps, said moveable part having rings with cylindrical outer surfaces fitting into cylindrical magnetic gaps formed by said cylindrical plateau portions.

11. A drive apparatus according to claim 10, comprising a current source having a signal input and two current outputs, each output coupled to a different one of said windings, said current source having means for emitting at one of said outputs a current to a coupled winding having a magnitude increasing with an increase of a signal to said signal input, and for emitting at the other of said output to another of said windings another current having a magnitude decreasing with said increase.

12. A drive apparatus according to claim 10, comprising a third magnetic yoke provided with a winding and having a pair of pole shoes forming a gap aligned with the gaps of said two magnetic yokes, said third magnetic pole shoes including grooves identical to those of said first and second yoke pole shoes, the rings of the moveable part also forming plateau portions, said plateau portions of the pole shoes of the yokes forming elevated portions interspaced by spaces.

13. A drive apparatus according to claim 12, wherein said spaces in said moveable portion and yokes have a first dimension along said straight line, and said elevated portions in said moveable portion and pole shoes have a second dimension along said straight line, said first dimension being twice said second dimension, and wherein said magnetic yokes have a distance between said yokes along said line, measured between outwardly facing ends of plateau portions equal to said second dimension.

14. An apparatus for producing linear motion between a stator and magnetic member comprising:
a plurality of magnetic yokes, each yoke including a pair of magnetic gaps located on opposite sides of a cylindrical aperture, said cylindrical aperture including annular grooves separated by a plateau, said cylindrical apertures aligned to have a center on a common line;
a longitudinal magnetic member disposed within said cylindrical apertures, said member including a plurality of annular grooves, each separated by a plateau portion; and
individual stator windings for each of said yokes, said stator windings adapted to receive related magnetic flux producing currents whereby linear motion between said yokes and longitudinal magnetic member is produced.

15. A drive apparatus comprising:

magnetic yoke means including first and second planar magnetic gaps, said gaps lying in parallel planes, and angularly displaced with respect to each other;

a rotatable shaft supporting first and second magnetic wings for rotation within said first and second planar magnetic gaps, respectively;

said wings including planar segmented blades of soft-iron magnetic material substantially coincident with said planes of said magnetic gaps; and first and second stator windings for establishing a magnetic flux across said gaps in response to first and second currents; and, means for providing first and second complementary currents to said first and second stator windings, one of said currents increasing in response to an increasing input signal, the remaining of said currents decreasing in response to said increasing input signal, said currents being related whereby when one of said currents is zero, the other is a predetermined magnitude, whereby said currents and angularly displaced gaps produce a linear rotational movement of said blades and shaft.

16. The drive apparatus of claim 15 further comprising a position sensor means connected to sense rotation of said shaft; and means for interrupting current supplied to said stator windings in response to sensed rotation of said shaft.

* * * * *